(12) United States Patent
Pollock et al.

(10) Patent No.: US 7,004,277 B2
(45) Date of Patent: Feb. 28, 2006

(54) POWER BLOCKS

(75) Inventors: Paul Pollock, Mattawan, MI (US); Darrell D. Thompson, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 35 days.

(21) Appl. No.: 10/280,429

(22) Filed: Oct. 25, 2002

(65) Prior Publication Data

US 2004/0079577 A1    Apr. 29, 2004

(51) Int. Cl.
*B60K 17/00* (2006.01)

(52) U.S. Cl. .................. 180/346; 180/354; 411/88

(58) Field of Classification Search ............... 180/352, 180/378, 354, 360, 380, 344, 346, 370; 411/87, 411/88; 74/606 R, 607; 277/637
See application file for complete search history.

(56) References Cited

U.S. PATENT DOCUMENTS

| | | | |
|---|---|---|---|
| 270,877 A * | 1/1883 | Dunn | 411/87 |
| 1,802,428 A * | 4/1931 | Hughes et al. | 180/352 |
| 2,299,900 A * | 10/1942 | Jackson | 280/124.107 |
| 2,877,756 A | 3/1959 | McCauley et al. | |
| 3,622,037 A | 11/1971 | Gildart | 220/73 |
| 3,858,752 A | 1/1975 | Marvin, Jr. et al. | 220/325 |
| 4,018,097 A | 4/1977 | Ross | |
| 4,380,301 A | 4/1983 | Eisman | 220/73 |
| 4,625,581 A | 12/1986 | Hull | 74/606 R |
| 4,721,040 A | 1/1988 | Mau | 100/211 |
| 4,740,124 A * | 4/1988 | Pearson et al. | 411/88 |
| 4,926,934 A | 5/1990 | Ivy | 165/173 |
| 5,161,638 A * | 11/1992 | Hirano | 180/360 |
| 5,271,294 A * | 12/1993 | Osenbaugh | 74/607 |
| 5,632,583 A * | 5/1997 | Schneider et al. | 411/84 |
| 6,041,880 A * | 3/2000 | Yamakaji et al. | 180/346 |
| 6,196,305 B1 | 3/2001 | Geiger | 165/149 |
| 6,553,865 B1 * | 4/2003 | Endreszl | 74/607 |
| 6,675,676 B1 * | 1/2004 | Beutler | 74/606 R |
| 6,796,404 B1 * | 9/2004 | Dick et al. | 188/1.11 E |

OTHER PUBLICATIONS

International Search Report in PCT Application PCT/US03/33953, International Search Authority, 3 pages.

* cited by examiner

*Primary Examiner*—David R. Dunn
(74) *Attorney, Agent, or Firm*—Dykema Gossett PLLC

(57) ABSTRACT

A support member for a differential carrier housing, including a body having first and second apertures configured to align with corresponding apertures on one side of a flange of a carrier housing and configured to receive fasteners extending through the apertures in the carrier housing and corresponding apertures in an axle housing disposed on the other side of the carrier housing, the body extending between the apertures in the carrier housing.

17 Claims, 3 Drawing Sheets

POWER BLOCKS

BACKGROUND OF THE INVENTION

1. Field of the Invention

The present invention relates to large trucks wherein the differential of the vehicle is mounted to an axle rather than to the vehicle body, and more particularly, to large trucks wherein the differential carrier housing is sealably mated with a large opening in the axle housing.

2. Discussion of Related Art

Most large vehicles include a wheeled frame that is powered by a front mounted engine. The engine is torsionally connected with a transmission. The output of the transmission is connected with a front drive shaft. A first universal joint is connected between the output shaft of the transmission and a front end of the front drive shaft. A second universal joint is connected between a second end of the front drive shaft and a rear drive shaft. A third universal joint is connected between the rear drive shaft and an input shaft of the differential carrier.

The differential carrier is mounted to the rear axle assembly. The rear axle assembly includes an axle housing which rotatably mounts two half shafts which extend to the driving wheels of the vehicle. The axle housing has a forward-facing central opening to receive the differential which divides torque to the half shafts in an equal fashion when the vehicle is being driven in a straight line and in a preferential, uneven fashion when the vehicle is in a turn.

The differential carrier is mounted in its own housing, which, typically is provided from a stamped metal part. The axle housing has a large, aforementioned central opening and is typically fabricated from a machined casting.

The differential housing has along its perimeter a flange that mounts and seals a flat surface that encircles the central opening of the axle housing. The flange of the differential housing must engage and seal with the axle housing to retain the lubricating grease within the differential and axle assemblies.

The fuel economy of large vehicles, such as trucks, has always been an economic issue. However, in the last quarter-century such issue has taken on a greater importance. Therefore, to maximize the fuel efficiency of trucks there has been a constant quest to reduce the weight of truck vehicular frames and drive line components. Accordingly, there has been a desire to utilize thinner materials in the carrier housing stamping and carrier casting.

Unfortunately, in certain conditions this trend may compromise the sealing capability of the interface between the carrier housing and the axle housing. Previously, a designer of a differential and axle combination for a vehicle was bound to using differential carrier housing made of thicker steel to achieve the sealing capabilities required.

SUMMARY OF THE INVENTION

To make manifest freedom to utilize lighter differential housing/axle housing combinations for large vehicles, a revelation of the present invention is brought forth. In a preferred embodiment the present invention brings forth the liberty of using lighter differential housings and differential housing/axle housing combination for truck-type vehicles. The present invention includes a support member for the differential carrier housing. The support member includes a body having first and second apertures configured to align with the corresponding apertures on the flange of the differential carrier housing. The support body apertures are also configured to receive fasteners extending through corresponding apertures in the axle housing. The reinforcing body extends arcuately between the apertures and can have a step portion to ensure that maximum sealing force is achieved on the flange between the apertures.

Other advantages of the present invention will be made apparent to those skilled in the art as the invention is further explained in the accompanying drawings and detailed description.

DETAILED DESCRIPTION OF THE INVENTION

Figure 1:
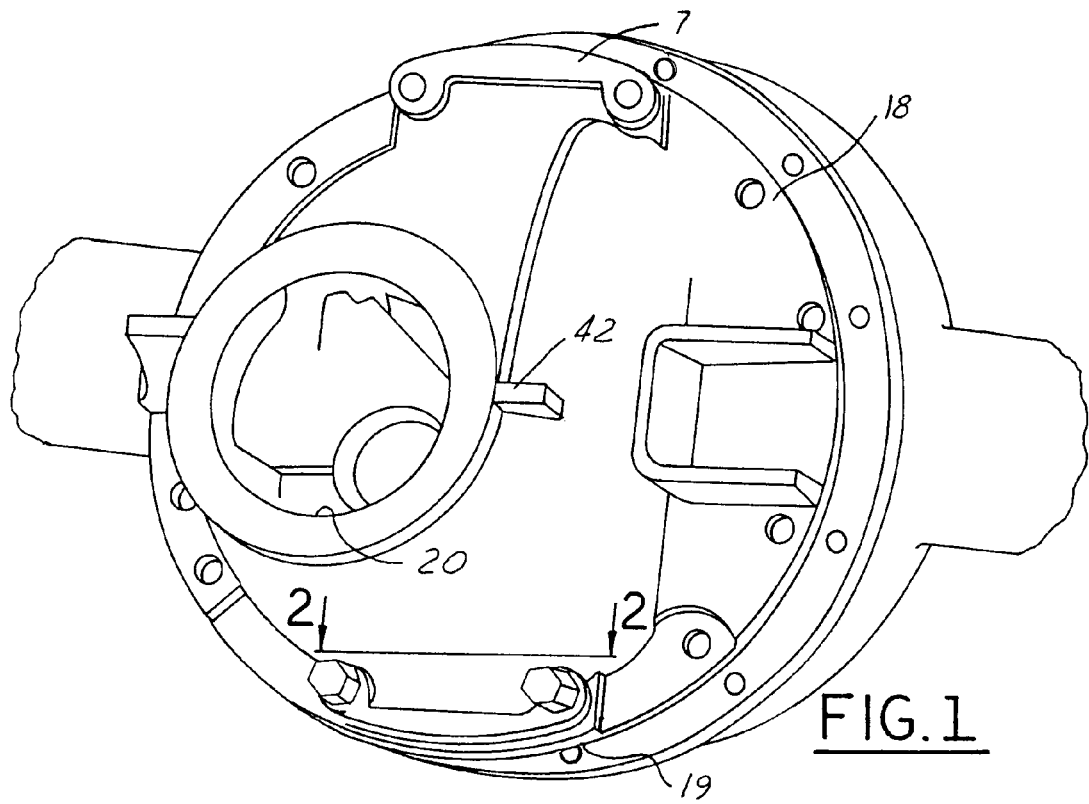
FIG. 1 is perspective view of a preferred embodiment support member for the differential carrier housing according to the present invention illustrated being held by threaded fasteners on a differential carrier housing.
Figure 2:
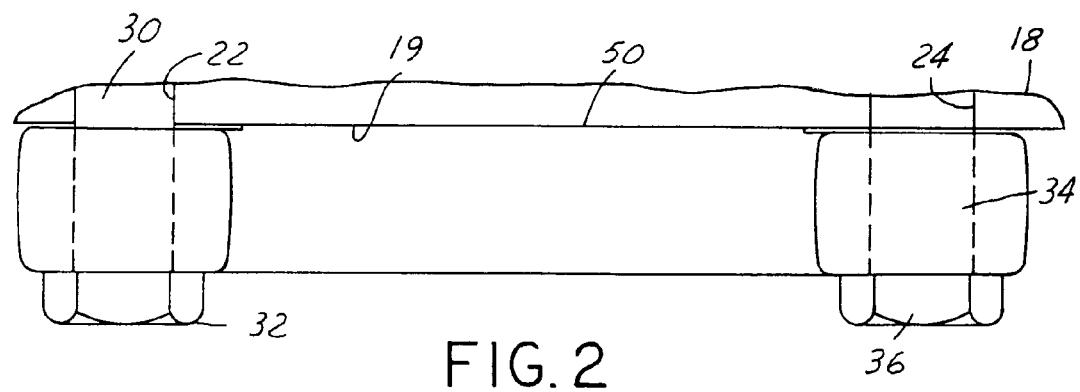
FIG. 2 is a top plan view taken along lines 2—2 of FIG. 1, of the support member for a differential carrier housing shown in FIG. 1.
Figure 3:
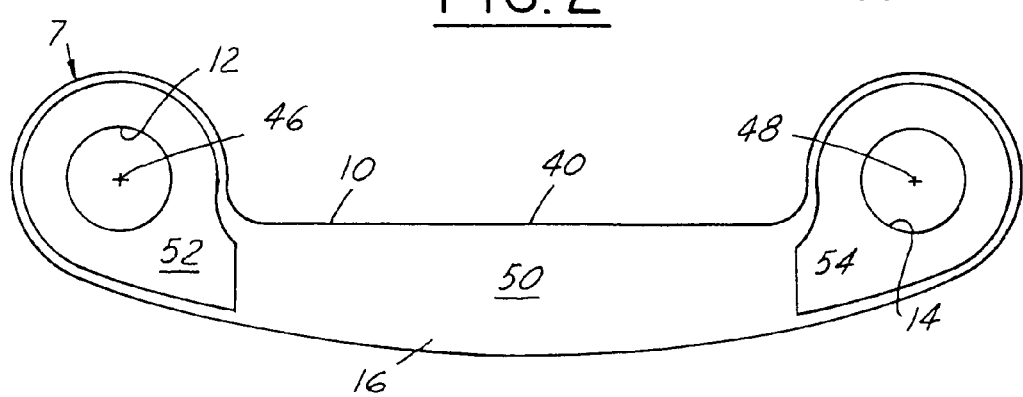
FIG. 3 is a front elevational view of the support member for the differential carrier housing shown in FIGS. 1 and 2.

Referring now to FIG. 1 a support member 7 for differential carrier housing is provided. The support member 7 has a first aperture 12. The support member also has a second aperture 14. The support member 7 has a body extending between the apertures 12 and 14. The support member has an inboard side 16. The inboard side 16 of the support member faces a differential carrier housing 18. The differential carrier housing 18 has an opening 20 that receives a universal joint (not shown) which is connected with the most rearward drive shaft (not shown). The differential carrier housing 18 provides cover and support for the differential carrier (not shown). The differential carrier housing has a peripheral flange 19. The differential housing flange 19 has an aperture 22. The aperture 22 is aligned with aperture 12 provided in the support member 7. The aperture 22 is also aligned with another aperture provided along a perimeter of the central opening of the axle housing (not shown). The differential carrier housing 18 also has an aperture 24. The aperture 24 is aligned with the aperture 14 in the support member body 10. The aperture 24 is also aligned with the corresponding aperture provided in the axle housing.

The support member body 10 aperture 12 is configured to receive a threaded fastener 30. The threaded fastener 30 extends between apertures provided in the axle housing, the differential carrier housing 18 and in the support body 10. Torqued on the shank of the fastener 30 is a nut 32.

The support body aperture 14 is configured to receive a threaded fastener 34. The threaded fastener 34 also extends through the aperture 24 and a corresponding aligned aperture provided in the axle housing. A hex head 36 of the fastener 34 is then torqued providing sufficient force to keep the supporting body 10, the differential housing 18 and the axle housing together.

The support body 10 has an inner cutout 40. The cutout 40 extends between the apertures 12 and 14 and terminates at a point prior to the apertures 12 and 14. Typically the cutout 40 will be inboard an arch which has its radius at a centerline 42 of the differential carrier housing 18 which also intersects the radial centerlines 46 and 48 of the apertures 12 and 14.

The support member body 10 has a raised step 50 which abuts the flange 19 of the differential carrier housing. The raised step 50 helps to ensure that the maximum force of connection applied by the support body 10 occurs between the two apertures 12 and 14. Typically the raised step 50 is provided as a result of milled faces 52 and 54 provided on the support body 10. As shown, the raised step is dimensioned approximately 0.76 millimeters.

Figure 4:
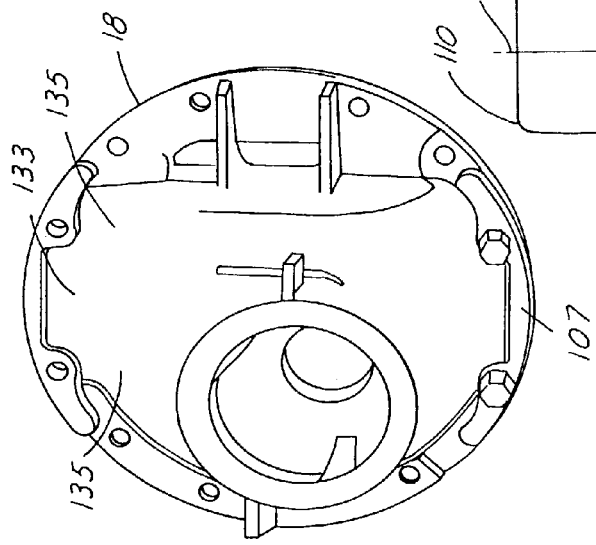
FIG. 4 is a perspective view similar to that of FIG. 1 of an alternate preferred embodiment support member for a differential carrier housing which additionally has arcuately extending wings.
Figure 5:
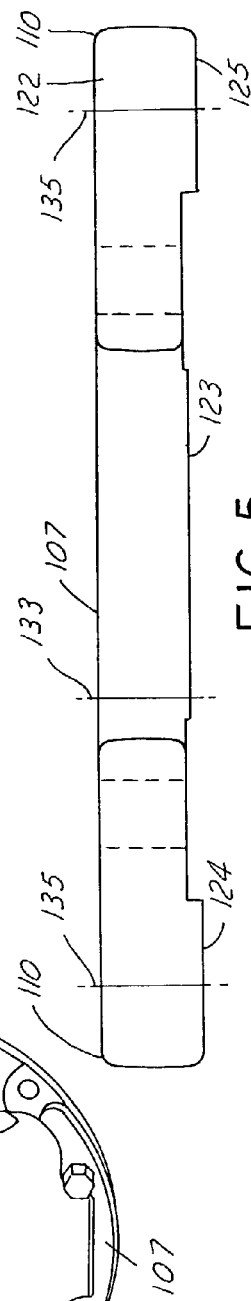
FIG. 5 is an enlarged top plan view of the support member for the differential carrier housing shown in FIG. 4.
Figure 6:
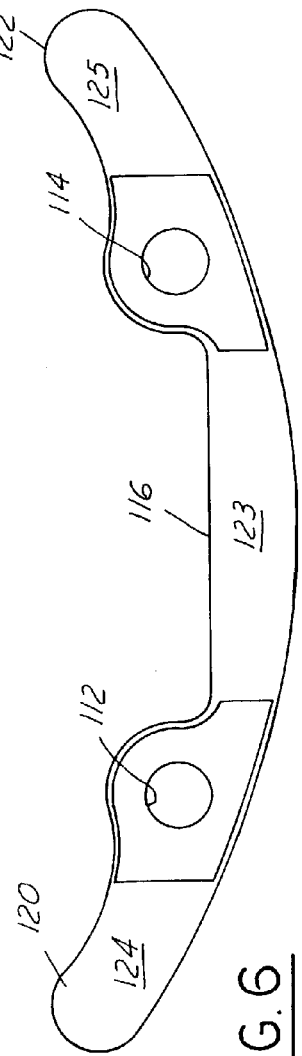
FIG. 6 is a front elevational view of the support member for the differential carrier housing shown in FIGS. 4 and 5.

Referring to FIGS. 4, 5 and 6 an alternate preferred embodiment support member 107 is provided. Support member 107 has a body 110. The support member body 110 has a first aperture 112. The support member 107 has a second aperture 114. The support body 110 has a radially inner cutout 116. Extending arcuately outwardly from the aperture 112 is a first wing 120. Extending arcuately outwardly from the second aperture 114 is a second wing 122.

The body 110 in a manner similar to that described for support member 7 has a raised step 123. The body 110 also has a raised step 124. The second wing 122 also has a raised step 125. The raised steps 124, 125 have a height which differs from raised step 123 and is approximately two millimeters.

The stack height of the support body and differential carrier at line 133 is the same as the stack height of the support body and the differential carrier housing at line 135. The wings 120, 122 spread the bolt loads further along the carrier flange and stiffen the carrier to the housing joint as much as possible. The wing 120 extends along an arcuate length generally at least approximately one half or more the arcuate length between the apertures 112 and 114.

Figure 7:
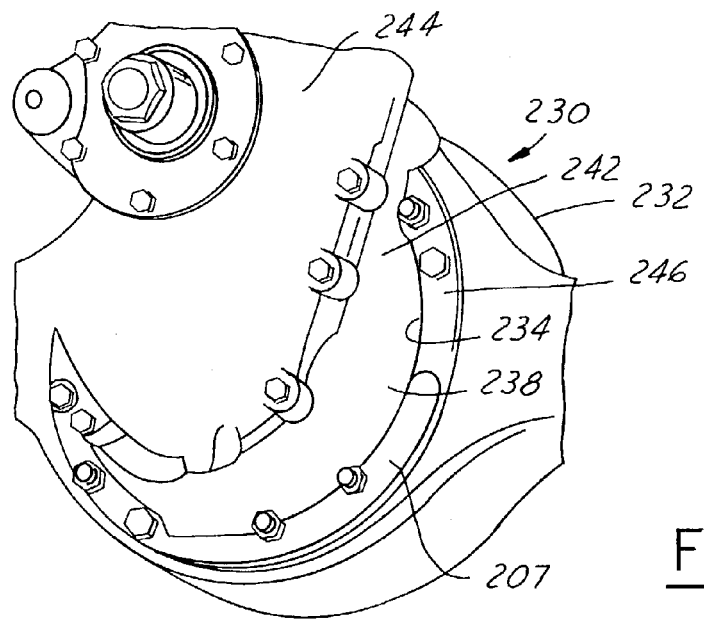
FIG. 7 is a perspective view of yet still another alternate preferred embodiment support member for a differential carrier housing illustrated in its environment of supporting a differential carrier housing upon a perimeter of a front opening of an axle housing.
Figure 8:
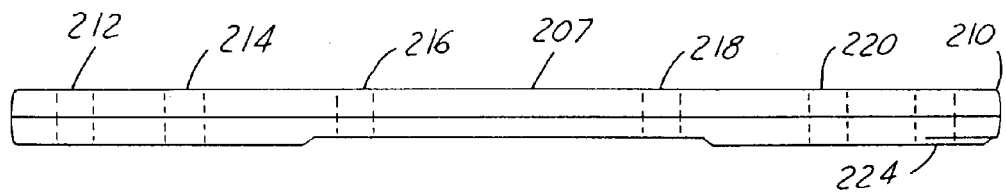
FIG. 8 is a top plan view of the differential carrier housing support member shown in FIG. 7.
Figure 9:
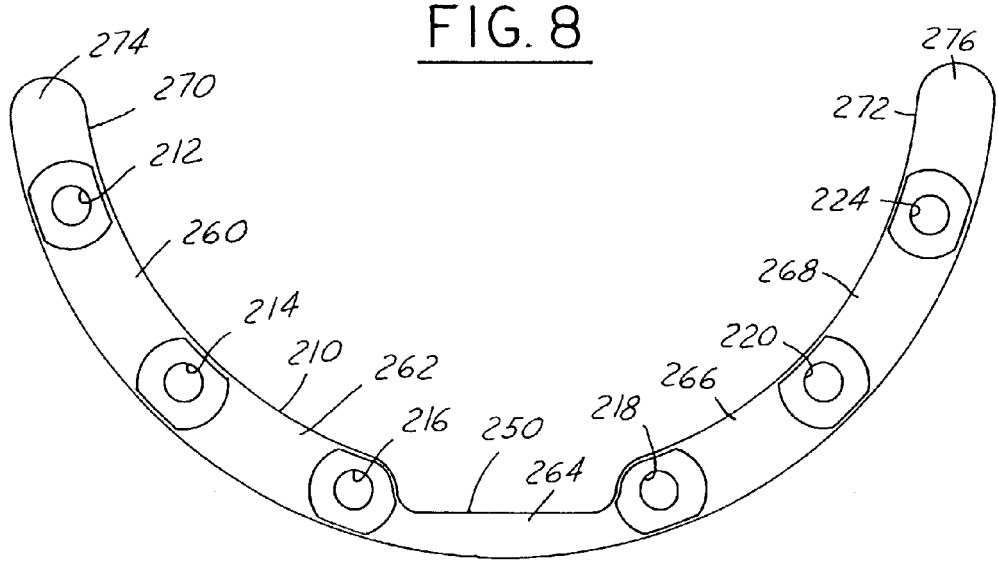
FIG. 9 is a front elevational view of the differential carrier housing support member shown in FIGS. 7 and 8.

Referring to FIGS. 7–9, yet another alternate preferred embodiment support member 207 is provided. The support member 207 has a body 210. The support member 207 arcuately extends along an angle equal to or greater than 120 degrees. The support member 207 has apertures 212, 214, 216, 218, 220 and 224.

The support member 207 is shown in its environment of a differential axle combination 230. The differential axle combination 230 has an axle housing 232. The axle housing 232 has an opening generally corresponding to an inner diameter 234 of the differential carrier housing 238. The differential carrier housing 238 is a two part member having an outer radial member 242 and an inner boltably attached member 244. The outer radial member 242 has a flange 246 which sealably abuts either directly or via a gasket a flat (not shown) of the axle housing 232 which encircles its central opening.

The support body 210 has an inner cutout 250 which extends between the apertures 216 and 218 (FIG. 9). The apertures 212, 214, 216, 218, 220 and 224 are all aligned with corresponding apertures provided in the flange 246 of the differential carrier housing. Between the various apertures are raised steps 260, 262, 264, 266 and 268. Partial wings 270 and 272 also have raised steps 274 and 276 associated therewith.

In a manner similar as previously described fasteners threadably connect the support member 207 against the flange 246 of the differential carrier housing to minimize or to eliminate any leakage between the differential carrier housing flange to axle housing interface. The step heights of the steps for the support member 207 may differ according to the thickness of the flange 246 of the differential carrier housing.

The present invention has been shown in various embodiments. However, it will be apparent to those skilled in the art of the various changes and modifications which can be made to the present invention without departing from the spirit or scope of the invention as it is encompassed by the following claims.

What is claimed is:

1. A support member for a differential carrier housing, comprising:
   a body having first and second apertures configured to align with corresponding apertures in a flange of said carrier housing, said body being on one side of said flange of said carrier housing and configured to receive fasteners extending through said apertures in said carrier housing and corresponding apertures in an axle housing disposed on the other side of said flange of said carrier housing, said body extending between said apertures in said carrier housing and said body having a raised step between said first and second apertures facing towards said carrier housing flange.

2. A support member for a differential housing as described in claim 1 having an inner cutout between said first and second apertures.

3. A support member for a differential housing as described in claim 1 having wings extending arcuately outwardly from said first and second apertures.

4. A support member for a differential housing as described in claim 3 wherein said wings extend generally arcuately approximately one-half the arcuate length between said first and second apertures.

5. A support member as described in claim 4 wherein said wings have a raised step portion.

6. A support member, as described in claim 5 wherein said support member has a raised step between said first and second apertures with a first step height and said wing raised steps have a second-step height differing from said first step height.

7. A support member, as described in claim 6 wherein said second step height is greater than said first step height.

8. A support member for a differential housing as described in claim 1 wherein said body extends along an arcuate path of at least 120 degrees or more.

9. A support member for a differential housing as described in claim 8 having third, fourth, fifth, and sixth apertures and wherein said body has a raised step between each pair of adjacent apertures of said first, second, third, fourth, fifth and sixth apertures.

10. A support member as described in claim 1 having multiple raised steps with some steps having a differing height.

11. A differential axle combination for a automotive vehicle, said combination comprising:
   an axle housing having a central opening, the perimeter of which has a series of arcuately spaced apertures for receiving threaded fasteners therein;

a differential carrier housing having a flange for mating with said axle housing, said differential carrier housing having at least first and second apertures configured to align with corresponding apertures in said axle housing; and a support member having a body having first and second apertures configured to align with said first and second apertures in a flange of said carrier housing, said body being on one side of said flange of said carrier housing and configured to receive fasteners extending through said first and second apertures in said carrier housing and said corresponding apertures in said axle housing, said body being on a side of said carrier housing opposite said axle housing, said body extending between said first and second apertures in said carrier housing and said body having a raised step between said first and second apertures of said body and facing towards said carrier housing flange.

12. A differential axle combination as described in claim 11 wherein said support member body has an inner cutout between said first and second apertures of said body.

13. A differential axle combination as described in claim 11 wherein said support member body has wings extending arcuately outwardly from said first and second apertures of said body.

14. A differential axle combination as described in claim 13 wherein said support member body wings extend generally arcuately approximately one-half the arcuate length between said first and second apertures of said body.

15. A differential axle combination as described in claim 13 wherein said support member body outer wings have a raised step portion.

16. A differential axle combination as described in claim 11 wherein said support member body extends along an arcuate path of at least 120 degrees or more.

17. A differential axle combination as described in claim 11 wherein said support member body has third, fourth, fifth and sixth aligned apertures and wherein said support member body has a raised step between each pair of adjacent apertures of said first, second, third, fourth, fifth and sixth apertures of said body.

* * * * *